(12) United States Patent
Sakai

(10) Patent No.: US 9,807,807 B2
(45) Date of Patent: Oct. 31, 2017

(54) COMMUNICATION DEVICE AND CONTROL METHOD THEREOF

(71) Applicant: CANON KABUSHIKI KAISHA, Tokyo (JP)

(72) Inventor: Tatsuhiko Sakai, Nakano-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/262,591

(22) Filed: Apr. 25, 2014

(65) Prior Publication Data

US 2014/0232883 A1 Aug. 21, 2014

Related U.S. Application Data

(63) Continuation of application No. 13/533,839, filed on Jun. 26, 2012, now Pat. No. 8,743,737, which is a continuation of application No. 11/448,215, filed on Jun. 7, 2006, now Pat. No. 8,233,405.

(30) Foreign Application Priority Data

Jun. 13, 2005 (JP) ................................. 2005-172969

(51) Int. Cl.
*H04W 76/02* (2009.01)
*H04L 12/28* (2006.01)
(Continued)

(52) U.S. Cl.
CPC ........ *H04W 76/021* (2013.01); *G06F 3/1205* (2013.01); *G06F 3/1232* (2013.01); *G06F 3/1236* (2013.01); *H04L 12/281* (2013.01); *H04L 12/2803* (2013.01); *H04L 41/12* (2013.01); *H04L 69/24* (2013.01); *H04N 1/00278* (2013.01); *H04N 1/00347* (2013.01); *H04L 12/282* (2013.01); *H04L 67/303* (2013.01); *H04L 2012/2841* (2013.01);
(Continued)

(58) Field of Classification Search
None
See application file for complete search history.

(56) References Cited

U.S. PATENT DOCUMENTS 7,359,950 B2 * 4/2008 Choi et al. .................... 709/209
7,849,150 B2 * 12/2010 Loeebbert et al. ........... 709/208
(Continued)

*Primary Examiner* — Hassan Kizou
*Assistant Examiner* — Roberta A Shand
(74) *Attorney, Agent, or Firm* — Canon U.S.A., Inc. IP Division

(57) ABSTRACT

A communication apparatus includes an acquisition unit, a determination unit, and a control unit. The acquisition unit acquires capability information on other communication apparatuses in a network. The determination unit determines, based on the capability information acquired by the acquisition unit, whether there is a communication apparatus having a specific function, related to data communication, to be performed after processing to set communication parameters is performed. The control unit perform controls, in response to the determination unit determining that there is a communication apparatus having the specific function, to continue the processing to set the communication parameters, and performs control, in response to the determination unit determining that there is no communication apparatus having the specific function, to terminate the processing to set the communication parameters.

10 Claims, 13 Drawing Sheets

(51) Int. Cl.
- *H04L 12/24* (2006.01)
- *H04N 1/00* (2006.01)
- *H04L 29/06* (2006.01)
- *G06F 3/12* (2006.01)
- *H04W 8/22* (2009.01)
- *H04W 8/24* (2009.01)
- *H04W 76/06* (2009.01)
- *H04L 29/08* (2006.01)

(52) U.S. Cl.
CPC ............ *H04N 2201/0027* (2013.01); *H04N 2201/0055* (2013.01); *H04N 2201/0084* (2013.01); *H04W 8/22* (2013.01); *H04W 8/245* (2013.01); *H04W 76/06* (2013.01)

(56) References Cited

U.S. PATENT DOCUMENTS

| | | | |
|---|---|---|---|
| 8,233,461 B1* | 7/2012 | Debaty | 370/338 |
| 8,572,222 B2* | 10/2013 | Sakai et al. | 709/223 |
| 2002/0055978 A1* | 5/2002 | Joon-Bo et al. | 709/209 |
| 2003/0124979 A1* | 7/2003 | Tanada et al. | 455/41 |
| 2005/0033816 A1* | 2/2005 | Yamaguchi | H04W 84/20 709/208 |
| 2006/0084456 A1* | 4/2006 | Dunko et al. | 455/519 |
| 2007/0076672 A1* | 4/2007 | Gautier | H04W 84/20 370/338 |
| 2007/0189322 A1* | 8/2007 | Hirose | H04W 8/245 370/447 |
| 2009/0232311 A1* | 9/2009 | Meier et al. | 380/277 |
| 2009/0240781 A1* | 9/2009 | Otsuka | H04W 84/20 709/208 |
| 2010/0332662 A1* | 12/2010 | Meylemans | H04W 8/005 709/227 |
| 2012/0250581 A1* | 10/2012 | Bilcu | G08B 25/009 370/254 |
| 2014/0207895 A1* | 7/2014 | Otsuka | H04W 8/005 709/208 |

\* cited by examiner

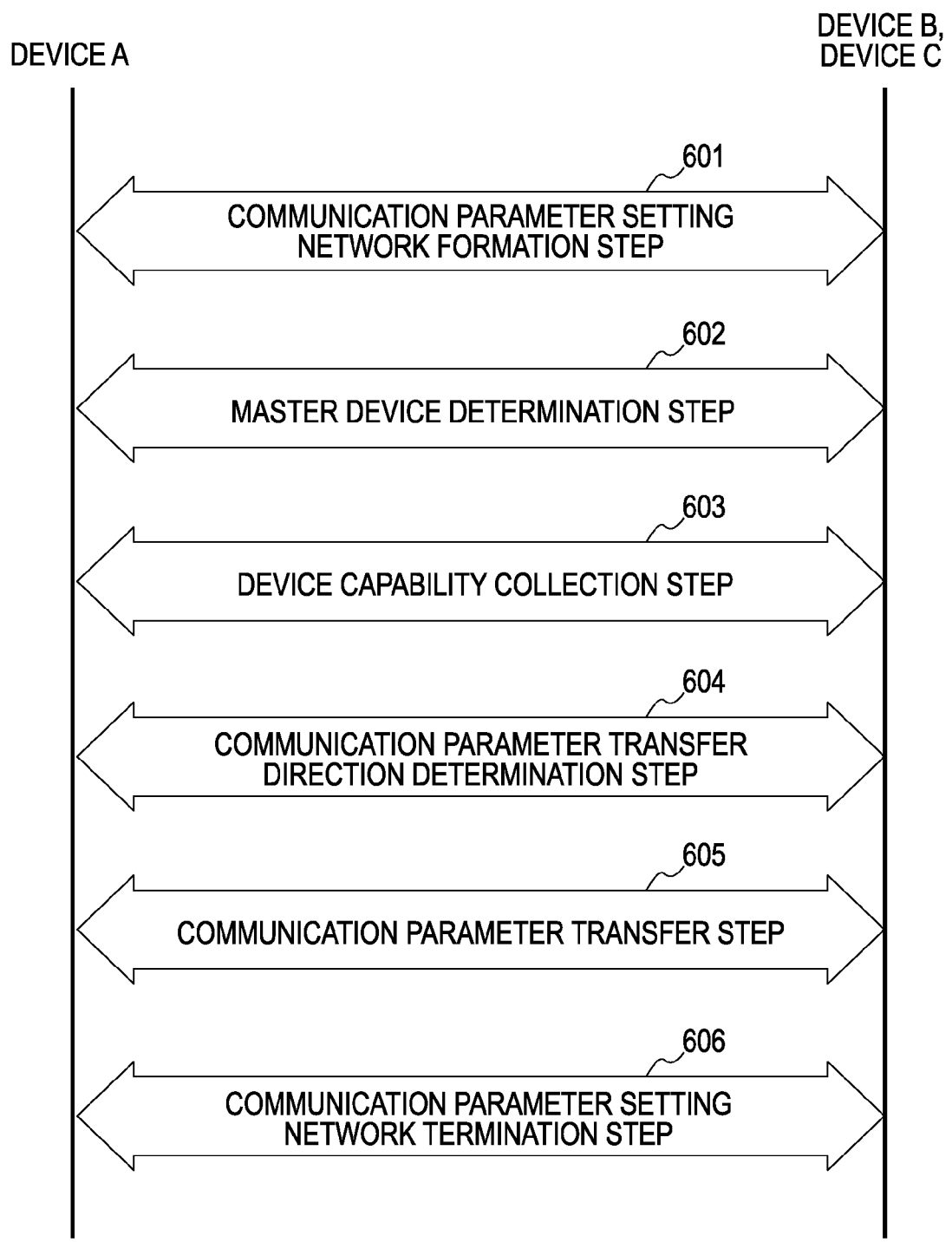

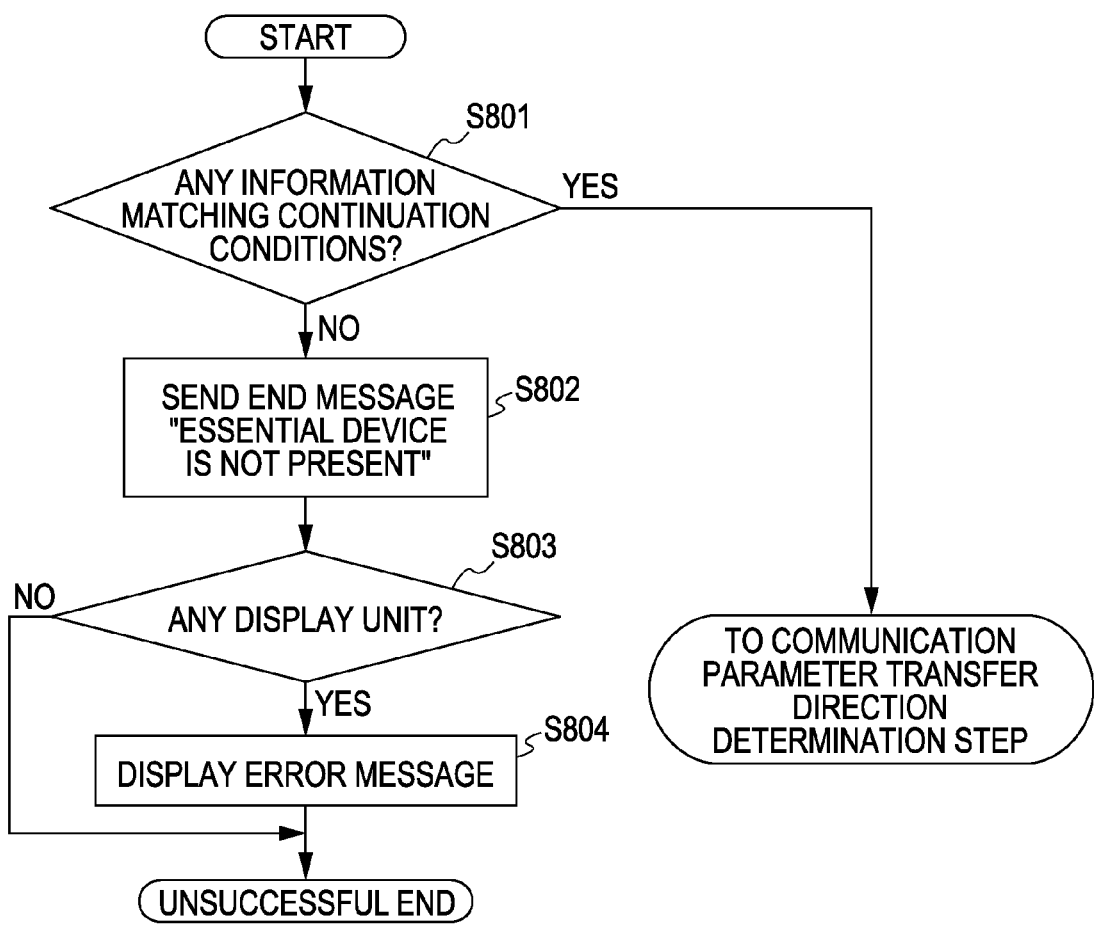

| DEVICE NO. | MAC ADDRESS | DEVICE TYPE | ATTRIBUTE VALUE 2 | ATTRIBUTE VALUE 3 |
|---|---|---|---|---|
| 1 | 00:00:32:7F:EB:43 | Digital Camera | *** | *** |
| 2 | 00:10:AE:CD:24:18 | Printer | *** | *** |
| 3 | 00:23:39:96:50:AC | Digital Camera | *** | *** |

COMMUNICATION PARAMETER SETTING ERROR

Communication with printer failed.

Check communication status of printer.

COMMUNICATION DEVICE AND CONTROL METHOD THEREOF

CROSS REFERENCE TO RELATED APPLICATIONS

The present application is a continuation of U.S. patent application Ser. No. 13/533,839 filed on Jun. 26, 2012, which is a continuation of U.S. patent application Ser. No. 11/448,215, filed on Jun. 7, 2006, which claims priority from Japanese Application No. 2005-172969, filed Jun. 13, 2005, all of which are hereby incorporated by reference herein in their entirety. U.S. patent application Ser. No. 11/448,215 issued on Jul. 31, 2012 as U.S. Pat. No. 8,233,405. U.S. patent application Ser. No. 13/533,839 issued on Jun. 3, 2014 as U.S. Pat. No. 8,743,737.

BACKGROUND OF THE INVENTION

Field of the Invention

The present invention relates to a communication device that stores information about conditions for continuing predetermined processing, and to a control method of the communication device.

Description of the Related Art

There are methods for automatically setting wireless communication parameters, such as service set identifiers (SSIDs), encryption methods, encryption keys, authentication methods, and authentication keys, which are cumbersome for users to deal with. For example, for a wireless local area network (LAN), there are commercially available methods for automatically transferring, from an access point (repeater) to a station (terminal), wireless communication parameter settings between the access point and the terminal with a simple operation.

Recently, there have been increasing opportunities for communication over ad hoc networks, where devices directly communicate with each other via a wireless LAN without going through an access point. As an example of such communication, FIG. 1 shows a network formed by a printer and a plurality of cameras and where images taken by the cameras are printed on the printer shared over the network.

For communication over such ad hoc networks, there are increasing needs for automating the setting of wireless communication parameters. To meet such needs, some techniques have been developed for automating the setting of wireless communication parameters for an ad hoc network using a wireless LAN. With such techniques, a master device is selected from devices joining a network. Then, the selected master device manages the joining and leaving of a device to and from the network. In such automating techniques, even if any one of a plurality of slave devices has left the network for some reason, the master device detects the leaving of the slave device and can continue the setting of communication parameters with the remaining slave devices.

A problem of such a network managed by a master device is that if the master device has left the network, it becomes no longer possible to continue setting communication parameters. In an attempt to provide a solution to this problem, US Patent Application Publication No. 20050086273 (corresponding to Japanese Patent Laid-Open No. 2004-129042) discusses a method in which, even if a master station has left a network, it is possible to continuously create a network.

However, according to this known method, if a printer to be used for printing has left a network, such as that shown in FIG. 1 to which a printer and a plurality of cameras are connected, a network that does not allow printing is created.

This presents a usability problem, as the user has to re-create a network including a printer, if a network that does not allow desired processing has been automatically created.

SUMMARY OF THE INVENTION

The present invention is directed to a communication device and a control method thereof that can reduce the probability of creating unnecessary networks and can properly create a network.

According to an exemplary embodiment of the present invention, a communication apparatus includes an acquisition unit configured to acquire capability information on other communication apparatuses in a network, a determination unit configured to determine, based on the capability information acquired by the acquisition unit, whether there is a communication apparatus having a specific function, related to data communication, to be performed after processing to set communication parameters is performed, and a control unit configured to perform control, in response to the determination unit determining that there is a communication apparatus having the specific function, to continue the processing to set the communication parameters, and to perform control, in response to the determination unit determining that there is no communication apparatus having the specific function, to terminate the processing to set the communication parameters.

According to another aspect of the present invention, the determining unit determines whether to continue the first processing on the basis of whether specific type information is included in the capability information collected by the collecting unit. According to another aspect of the present invention, the determining unit determines not to continue the first processing, the control unit sends an end message to the other devices and terminates the first processing.

According to yet another aspect of the present invention, the communication device further includes a display unit configured to display a message according to the determination made by the determining unit. Additionally, in another aspect of the present invention, the determining unit performs the determination when the communication device functions as a management device that manages a network created for setting communication parameters.

Furthermore, according to yet another aspect of the present invention, the determining unit performs the determination when the collecting unit collects capability information about the other communication devices. Also, according to another aspect of the present invention, the first processing is the setting of communication parameters for creating a network that allows a second processing between the communication device and the other communication devices to be performed.

According to another exemplary embodiment of the present invention, a communication method is provided which includes collecting capability information about communication devices joining a network; determining, on the basis of the collected capability information, whether to continue first processing between a communication device that has collected the capability information and communication devices from which the capability information has been collected; and performing control to terminate the first processing according to the determination.

According to an aspect of the embodiment, the determining includes determining whether to continue the first processing on the basis of whether specific type information is included in the collected capability information. According to yet another aspect of the present invention, the determining is executed by a management device configured to manage a network created for setting communication parameters.

Moreover, according to another aspect of the present invention, the communication method may further include detecting that a management device that manages a network created for setting communication parameters has left the network; and creating another network, by a new management device, on the basis of a detection that a management device has left the network, wherein the determining is executed by the new management device.

And according to yet another embodiment of the present invention, the communication method may further include detecting that a communication device other than a management device that manages a network created for setting communication parameters has left the network; and changing the collected capability information on the basis of the detection, wherein the determining includes determining whether to continue the first processing on the basis of the changed capability information. Also, according to another aspect of the present invention, the first processing is the setting of communication parameter for creating a network that allows second processing between the communication devices to be performed.

According to another exemplary embodiment of the present invention, a computer readable medium is provide containing computer-executable instructions for a control method utilized in a communication device. The medium includes computer-executable instructions for collecting capability information about communication devices joining a network; computer-executable instructions for determining, on the basis of the collected capability information, whether to continue first processing between a communication device that has collected the capability information and communication devices from which the capability information has been collected; and computer-executable instructions for performing control to terminate the first processing according to the determination.

According to yet another aspect of the present invention, the determining computer-executable instructions determines whether to continue the first processing on the basis of whether specific type information is included in the collected capability information. And according to another exemplary embodiment of the present invention, the determining computer-executable instructions are executed by a management device configured to manage a network created for setting communication parameters.

According to still another aspect of the present invention, the computer readable medium may further include computer-executable instructions for detecting that a management device that manages a network created for setting communication parameters has left the network; and computer-executable instructions for creating another network, by a new management device, on the basis of a detection that a management device has left the network, wherein the determining computer-executable instructions are executed by the new management device.

Further, according to another aspect of the present invention, the computer readable medium may further include computer-executable instructions for detecting that a communication device other than a management device that manages a network created for setting communication parameters has left the network; and computer-executable instructions for changing the collected capability information on the basis of the detection, wherein determining computer-executable instructions determines whether to continue the first processing on the basis of the changed capability information. An also, according to another aspect of the present invention, the first processing is the setting of communication parameter for creating a network that allows second processing between the communication devices to be performed.

Further features and aspects of the present invention will become apparent from the following description of exemplary embodiments with reference to the attached drawings.

BRIEF DESCRIPTION OF THE DRAWINGS

FIG. 6 shows an exemplary sequence of setting wireless communication parameters according to the first exemplary embodiment.

FIG. 7 shows an exemplary configuration of network continuation condition information.

FIG. 8 is a flowchart showing exemplary network continuation determination processing performed by a master device according to the first exemplary embodiment.

DESCRIPTION OF THE EMBODIMENTS

Numerous exemplary embodiments for implementing the present invention will now herein be described in detail with reference to the drawings.

First Exemplary Embodiment

Figure 1:
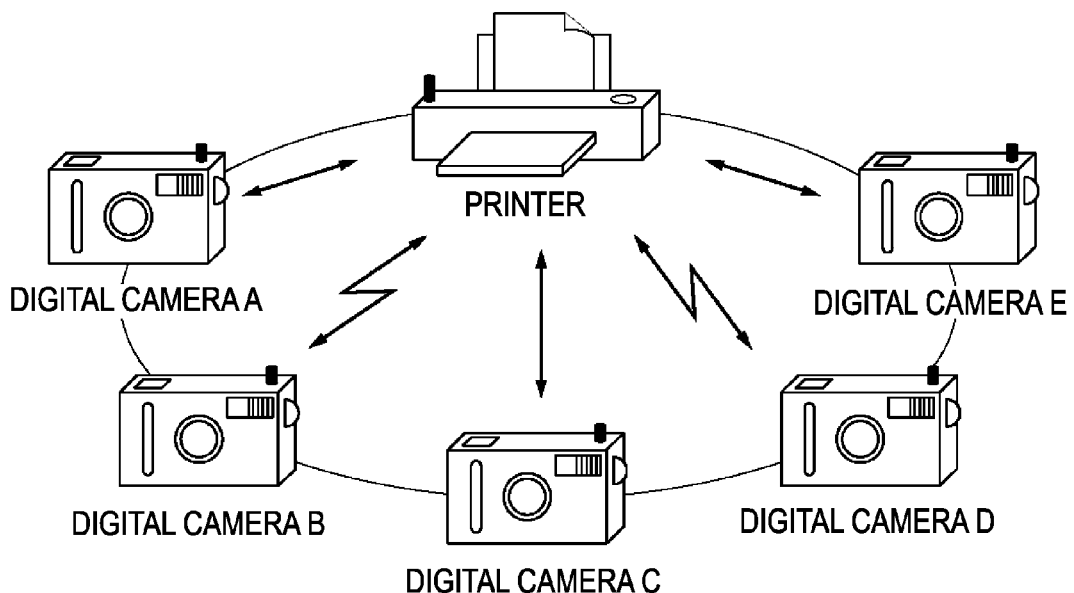
FIG. 1 is a diagram of a conventional ad hoc network which includes a printer and a plurality of cameras.
Figure 2:
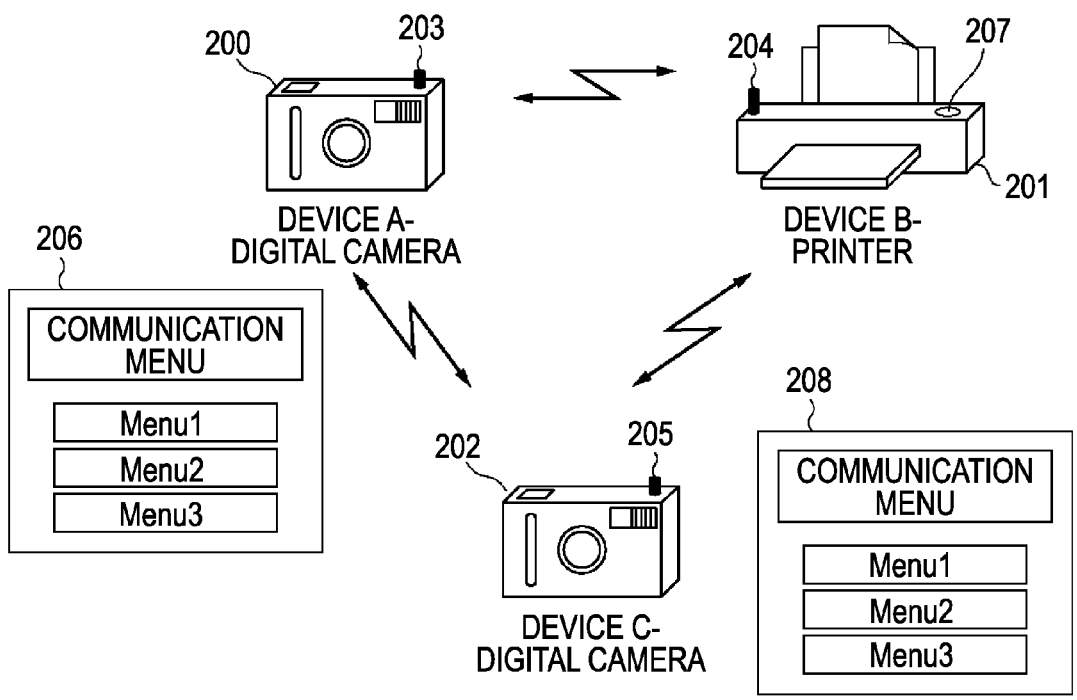
FIG. 2 shows an exemplary configuration of a wireless LAN according to a first exemplary embodiment of the present invention.

FIG. 2 shows an exemplary configuration of a wireless LAN according to the first exemplary embodiment of the present invention. A wireless communication device A is a digital camera 200 having an Institute of Electrical and Electronics Engineers (IEEE) 802.11-compliant wireless LAN function (or the like) as a wireless communication function 203, for example. When the user selects an option from a communication menu 206 displayed in a display unit to start setting mode, the digital camera 200 can constitute a part of a network in communication parameter setting mode.

A wireless communication device B is a printer 201 having an IEEE802.11-compliant wireless LAN function (or the like) as a wireless communication function 204, for example. When the user switches a communication parameter setting start switch 207, the printer 201 can constitute a part of the network in communication parameter setting mode.

Like the wireless communication device A, a wireless communication device C is a digital camera 202 having an IEEE802.11-compliant wireless LAN function (or the like) as a wireless communication function 205, for example. When the user selects an option from a communication menu 208 displayed in a display unit to start setting mode, the digital camera 202 can constitute a part of the network in communication parameter setting mode.

Then, the setting of wireless communication parameters for ad hoc communication between the digital camera 200 (device A), printer 201 (device B), and digital camera 202 (device C) is performed. Examples of wireless communication parameters include SSIDs serving as network identifiers, encryption methods, encryption keys, authentication methods, and authentication keys that are necessary for communication over an IEEE802.11-compliant wireless LAN. Communication parameter setting mode is a mode for automatically setting communication parameters such as those described above.

The configuration of the digital camera 200 (device A) and printer 201 (device B) will now be described with reference to FIG. 3 and FIG. 4. The digital camera 202 (device C) has a similar configuration to that of the digital camera 200 (device A).

Figure 3:
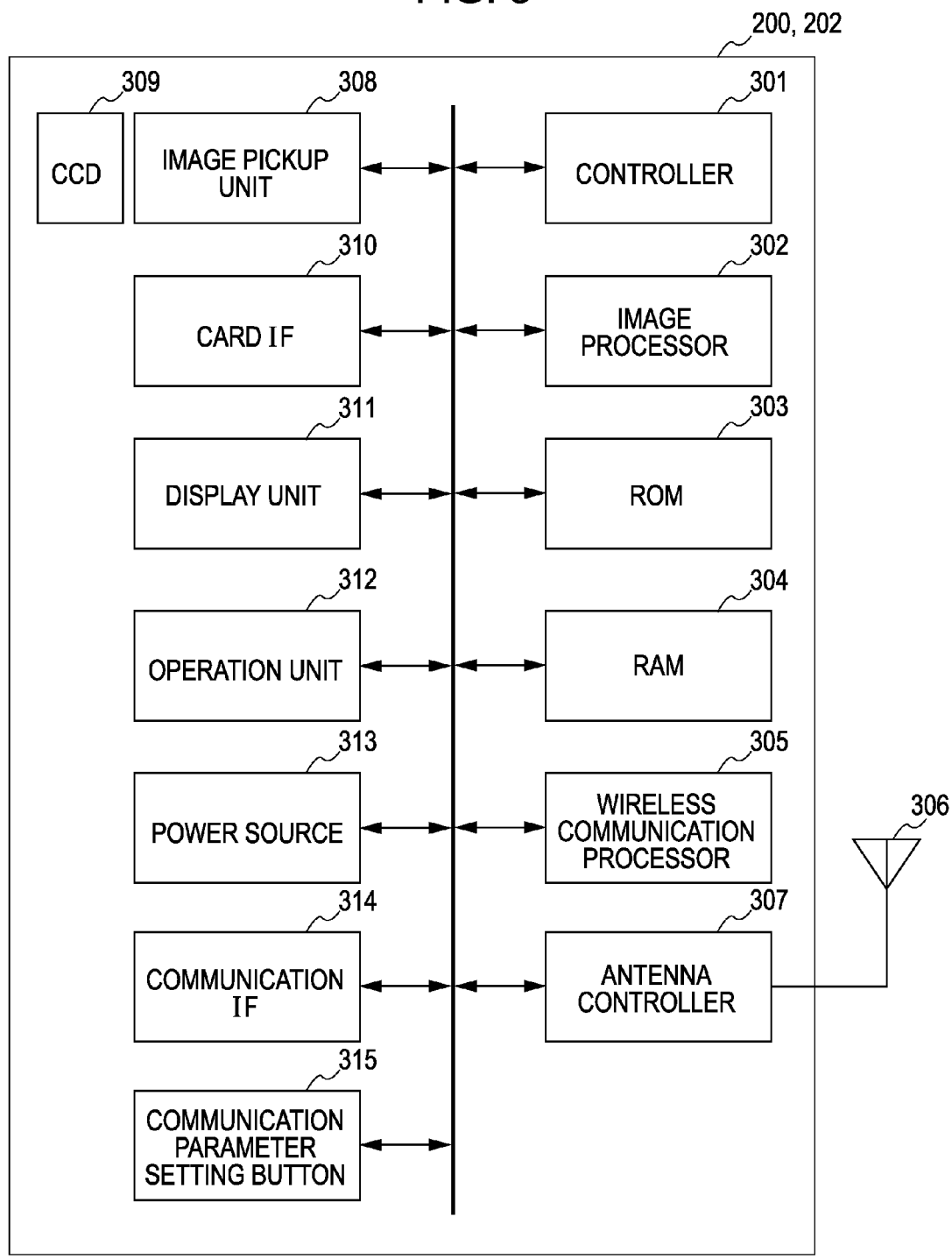
FIG. 3 is a schematic block diagram showing an exemplary configuration of a digital camera 200 (device A).

FIG. 3 is a schematic block diagram showing an exemplary configuration of the digital camera 200 (device A). Referring to FIG. 3, the digital camera 200 includes a controller 301 that controls the digital camera 200, an image processor 302, a read-only memory (ROM) 303 in which a control instruction (program) and control data are stored, and a random-access memory (RAM) 304. Communication parameters for forming a network for setting communication parameters are prestored in the RAM 304. The digital camera 200 further includes a wireless communication processor 305 that performs communication control in a wireless LAN, an antenna 306, and an antenna controller 307.

The digital camera 200 further includes an image pickup unit 308, a charge-coupled device (CCD) 309, a card interface (IF) 310, a display unit 311, an operation unit 312, a power source 313, a communication interface 314, and a communication parameter setting button 315. The image pickup unit 308 receives pixel signals input from the CCD 309. The card interface 310 controls a recording medium card for storing captured images and setting information. The display unit 311 displays error messages and the like. The operation unit 312 has buttons for allowing photographing, reproduction, setting, and the like. The power source 313 includes a secondary battery. The communication interface 314 is not a wireless interface but is, for example, a wired interface, such as a universal serial bus (USB) or IEEE1394 interface. The communication parameter setting button 315 is provided for starting the setting of communication parameters.

Figure 4:
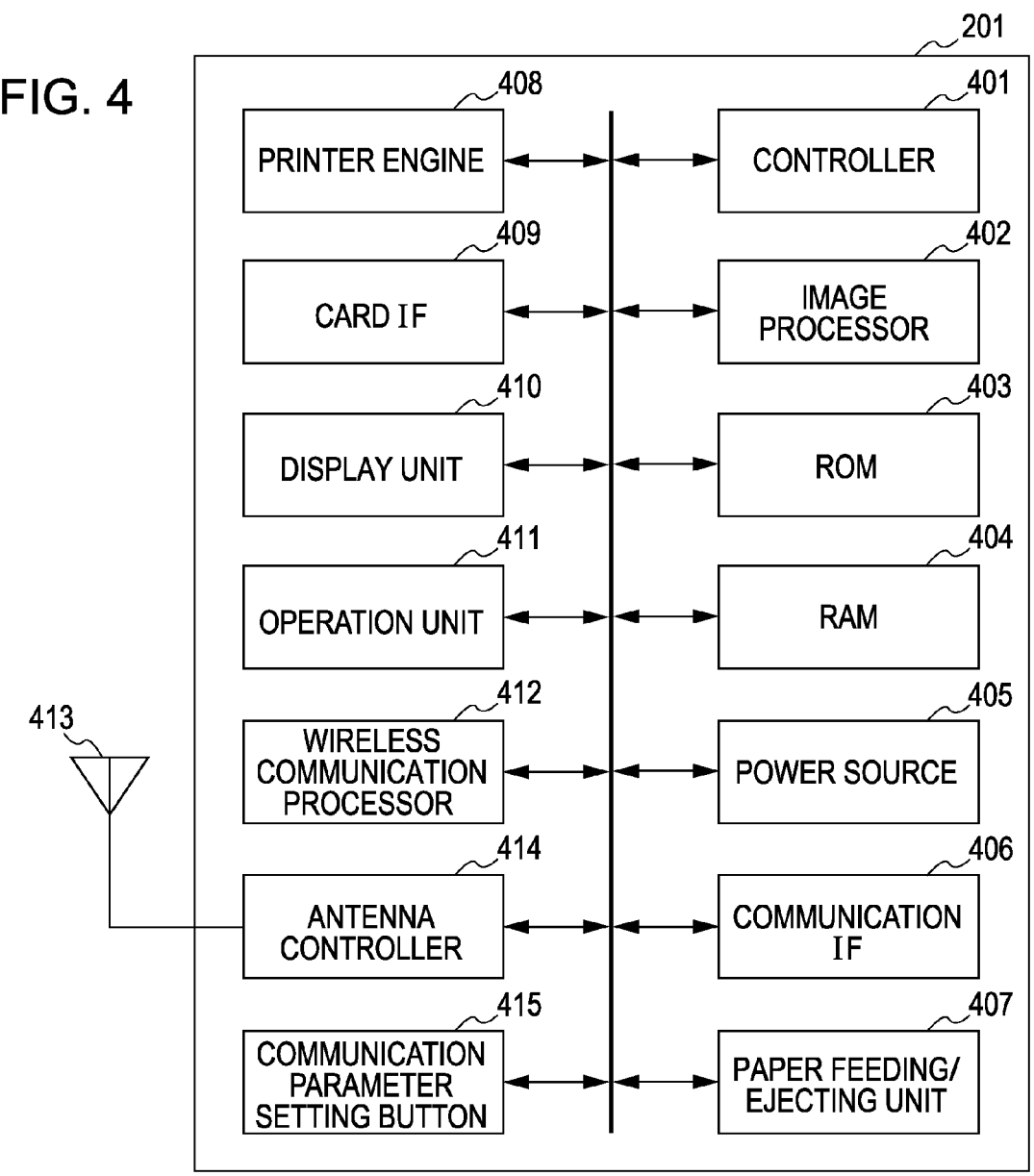
FIG. 4 is a schematic block diagram showing an exemplary configuration of a printer 201 (device B).

FIG. 4 is a schematic block diagram showing an exemplary configuration of the printer 201 (device B). Referring to FIG. 4, the printer 201 includes a controller 401 that controls the printer 201, an image processor 402, a ROM 403 in which a control instruction (program) and control data are stored, a RAM 404 in which communication parameters for forming a network for setting communication parameters are prestored, a power source 405, and a communication interface 406 that is not a wireless interface but is, for example, a wired interface, such as a USB or IEEE1394 interface.

The printer 201 further includes a paper feeding/ejecting unit 407, a printer engine 408, a card interface 409, a display unit 410, an operation unit 411, a wireless communication processor 412, an antenna 413, an antenna controller 414, and a communication parameter setting button 415. The paper feeding/ejecting unit 407 feeds and ejects printer paper. The printer engine 408 performs print control for electrophotographic printing, inkjet printing, or the like. The card interface 409 controls a recording medium card in which images are stored. The display unit 410 displays error messages and the like. The operation unit 411 includes menu buttons and setting buttons. The wireless communication processor 412 performs communication control in a wireless LAN. The communication parameter setting button 415 is provided for starting the setting of communication parameters.

Figure 5:
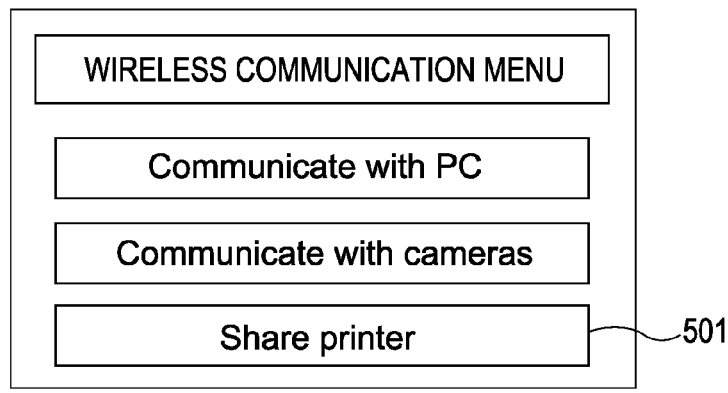
FIG. 5 shows an exemplary communication menu displayed on a display unit of a digital camera.

To share the printer 201 for printing, each of the users of the digital cameras 200 and 202 selects, from the respective communication menus 206 and 208 (see FIG. 5), an option 501 of sharing a printer among a plurality of cameras. At the same time, switching the communication parameter setting start switch 207 of the printer 201 starts the setting of communication parameters between the digital cameras 200 and 202 and the printer 201.

The following describes, with reference to FIG. 6, exemplary processing for setting wireless communication parameters between the device A, device B, and device C in an IEEE802.11-compliant wireless LAN ad hoc network.

FIG. 6 shows an exemplary sequence of setting wireless communication parameters according to the first exemplary embodiment. As shown in FIG. 6, the flow is divided into six steps described in detail below.

<Communication Parameter Setting Network Formation Step 601>

This step involves forming an ad hoc network between the device A, device B, and device C for setting communication parameters therebetween.

<Master Device Determination Step 602>

This step involves selecting a master device and slave devices from the device A, device B, and device C on the communication parameter setting network. At the same time, each device continuously monitors whether a device with which to communicate is present on the same network.

<Device Capability Collection Step 603>

In this step, a master device selected in step 602 sends requests to slave devices for device capability attribute values of the slave devices and collects the received attribute values. After the collection, the master device performs network continuation determination processing, using the collected device capability attribute values and its own device capability attribute values, to determine whether to retain the network.

<Communication Parameter Transfer Direction Determination Step 604>

In this step, the master device compares each slave device's capability attribute values collected in step 603 with its own device capability attribute values to determine from which device to which device communication parameters should be transferred. Moreover, the master device transfers, to each slave device, instructions including destination and source information necessary for the transfer of communication parameters.

<Communication Parameter Transfer Step 605>

This step involves actually transferring communication parameters from a device with communication parameter sending capabilities to a device with communication parameter receiving capabilities, according to the communication parameter transfer direction determined in step 604.

<Communication Parameter Setting Network Termination Step 606>

This step involves performing processing necessary for terminating the communication parameter setting network in response to the completion of the transfer in step 605. After the completion of step 606, another network is created using communication parameters transferred in step 605.

Next, exemplary network continuation determination processing performed during the above-described setting of communication parameters will be described in detail.

In the first exemplary embodiment, when a master device is selected in master device determination step 602, the master device stores in a storage unit thereof (i.e., the RAM 304 of the digital camera 200 or 202, or the RAM 404 of the printer 201) network continuation condition information shown in FIG. 7.

As shown in FIG. 7, a table of the network continuation condition information includes columns of information TYPE 701 and information VALUE 702 that contain information about a device essential for processing to be performed in a network to be created by the setting of communication parameters. For example, in the first exemplary embodiment, since the presence of a printer is essential for printing through a shared printer, "Device type" is stored in the column of information TYPE 701 and "Printer" is stored in the column of information VALUE 702.

Figures 9, 10:
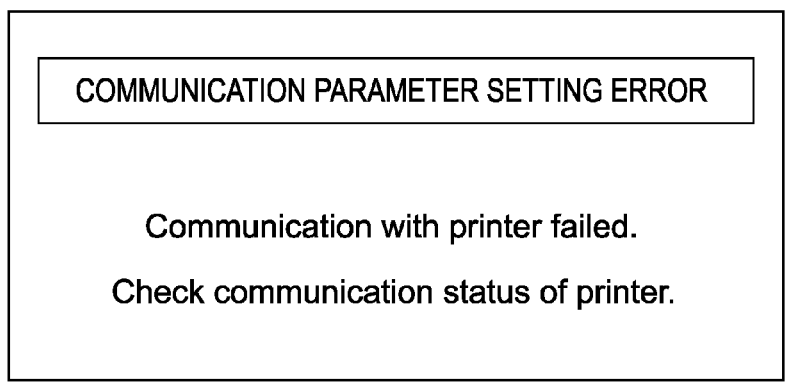
FIG. 9 shows an exemplary configuration of slave device capability attribute information stored in a master device.
FIG. 10 shows an exemplary error message displayed in a display unit of a master device.

Next, network continuation determination processing performed by the master device in device capability collection step 603 will be described with reference to FIG. 8 which is a flowchart showing network continuation determination processing performed by the master device according to the first exemplary embodiment. First, in step S801, the master device examines the collected device capability attribute information about each slave device to determine if there is information that matches the stored network continuation condition information. The device capability attribute information about each slave device is stored in the RAM 304 or RAM 404, which serves as a storage unit, in the form of a table as shown in FIG. 9. If in the table there is an item that matches the stored network continuation condition information, the master device determines that it is possible to continue the processing, and the process proceeds to communication parameter transfer direction determination step 604. If no match is found, the process proceeds to step S802.

In step S802, since a device essential for performing the processing is not present, the master device determines that it is impossible to continue the processing and broadcasts an end message to each slave device. The end message can contain the cause of termination of the communication parameter setting. In the first exemplary embodiment, a message "Essential device is not present" is sent as a cause of the termination.

Next, in step S803, the master device determines whether the device itself has a display unit. If the master device has a display unit, the process proceeds to step S804. If the master device does not have a display unit, the communication parameter setting ends unsuccessfully.

In step S804, the master device displays an error message, as in FIG. 10, in the display unit thereof so as to immediately inform the user of the failure of the processing and the cause of the failure. Then, the master device terminates the communication parameter setting unsuccessfully.

In the first exemplary embodiment described above, the master device displays an error message as in FIG. 10 to inform the user of the failure and its cause. Other possible informing methods include the blinking of a light-emitting diode (LED) and the use of synthesized voice.

Thus, the network continuation determination processing is performed according to the procedure described above.

Figure 11:
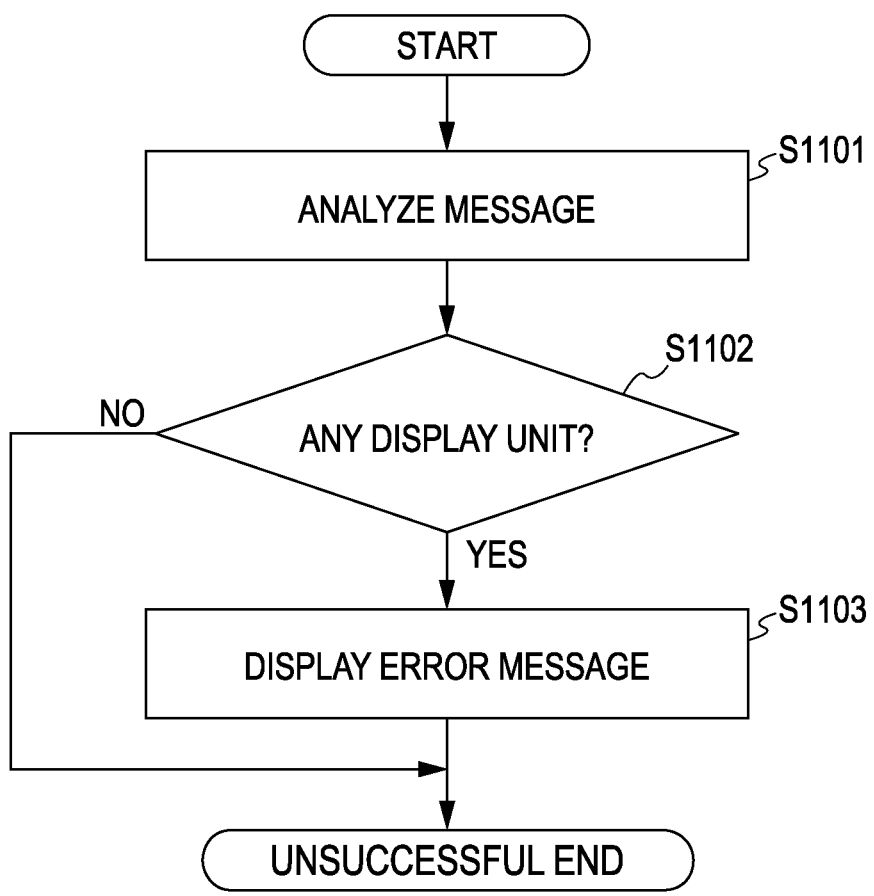
FIG. 11 is a flowchart showing exemplary error message display processing performed in a slave device.

Next, error message display processing performed when a slave device receives an end message sent by the master device in step S802 will be described with reference to FIG. 11 which is a flowchart showing error message display processing performed in a slave device. First, in step S1101, a slave device analyzes the content of an end message received from the master device and identifies the cause of termination "Essential device is not present". Next, in step S1102, the slave device determines whether the device itself has a display unit. If the slave device has a display unit, the process proceeds to step S1103. If the slave device does not have a display unit, the communication parameter setting ends unsuccessfully.

In step S1103, the slave device displays an error message in the display unit thereof to immediately inform the user of the failure of the processing and the cause of the failure. Then, the slave device terminates the communication parameter setting unsuccessfully.

Thus, according to the procedure described above, the slave device performs the error message display processing upon receipt of an end message.

The following describes, with reference to sequence diagrams of FIG. 12 through FIG. 14, exemplary procedures according to which the digital camera 200 (device A), printer 201 (device B), and digital camera 202 (device C) in FIG. 2 perform the network continuation determination processing that has been described with reference to FIG. 6 through FIG. 9.

Figure 12:
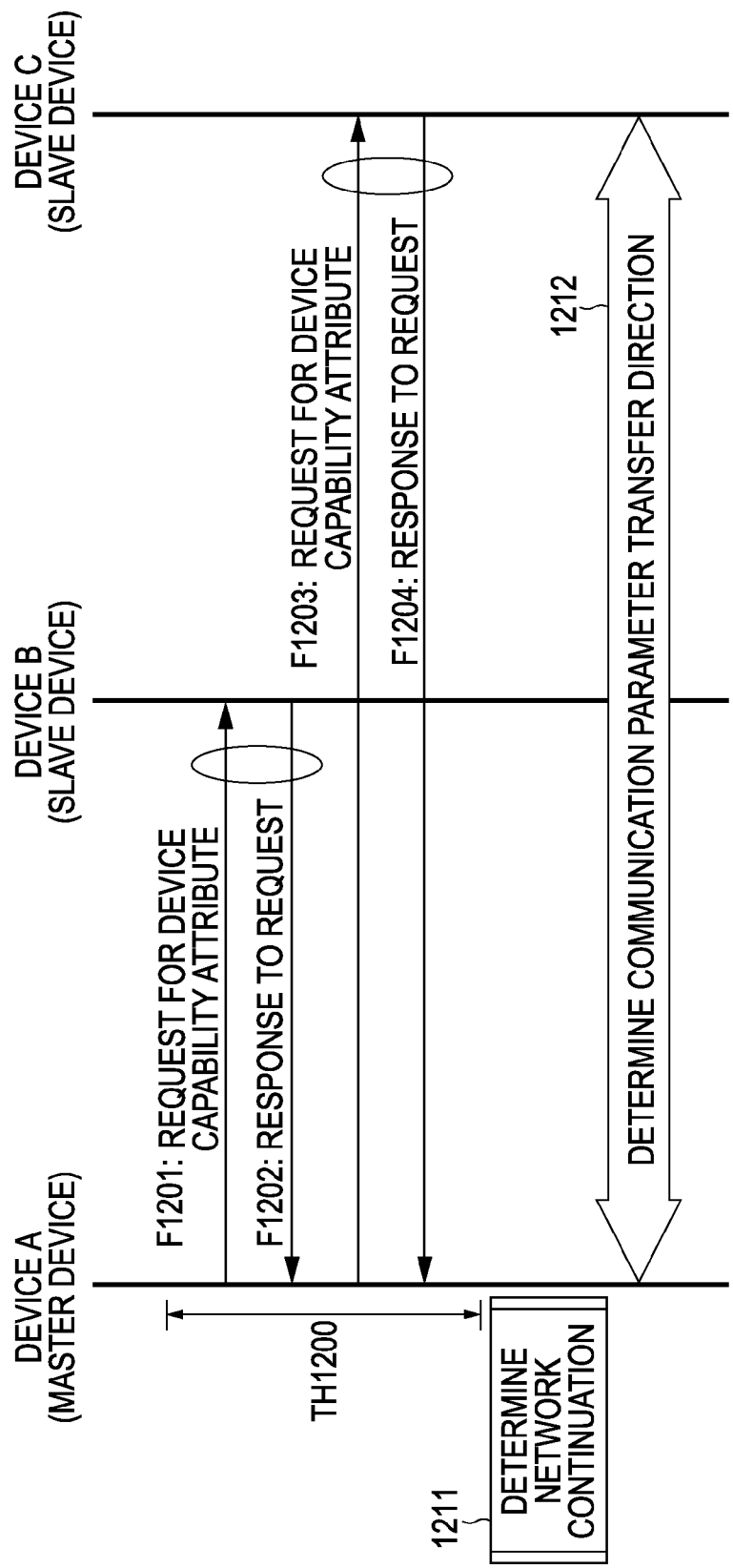
FIG. 12 is a sequence diagram showing an exemplary procedure according to which, after the device A is determined to be a master device in master device determination step, the device A collects device capability attribute information from the device B and device C, which are slave devices, to perform network continuation determination processing.

FIG. 12 is a sequence diagram showing an exemplary procedure according to which, after the device A is determined to be a master device in master device determination step 602, the device A collects device capability attribute information from the device B and device C, which are slave devices, to perform network continuation determination processing. FIG. 12 shows an example in which no device leaves the network and the processing proceeds normally.

First, after starting the processing, the device A activates a timer for use in collecting device capability attribute information and collects device capability attribute information from each slave device during a time period TH1200. Specifically, during the time period TH1200, the device A sends device capability attribute request messages (F1201 and F1203) to the device B and device C, respectively, and receives device capability attribute information (F1202 and F1204) as responses.

After the timer for use in collecting device capability attribute information comes to an end (i.e., a timeout occurs), the device A uses network continuation condition information (see FIG. 7) stored in the RAM 304 and the collected device capability attribute information about each slave device to perform network continuation determination processing (1211). Since the device capability attribute information about the device B (printer 201), which is an essential device, has been obtained in the example shown in FIG. 12, the device A determines that it is possible to continue the processing and performs communication parameter transfer direction determination processing (1212) between the device A, device B, and device C.

Figure 13:
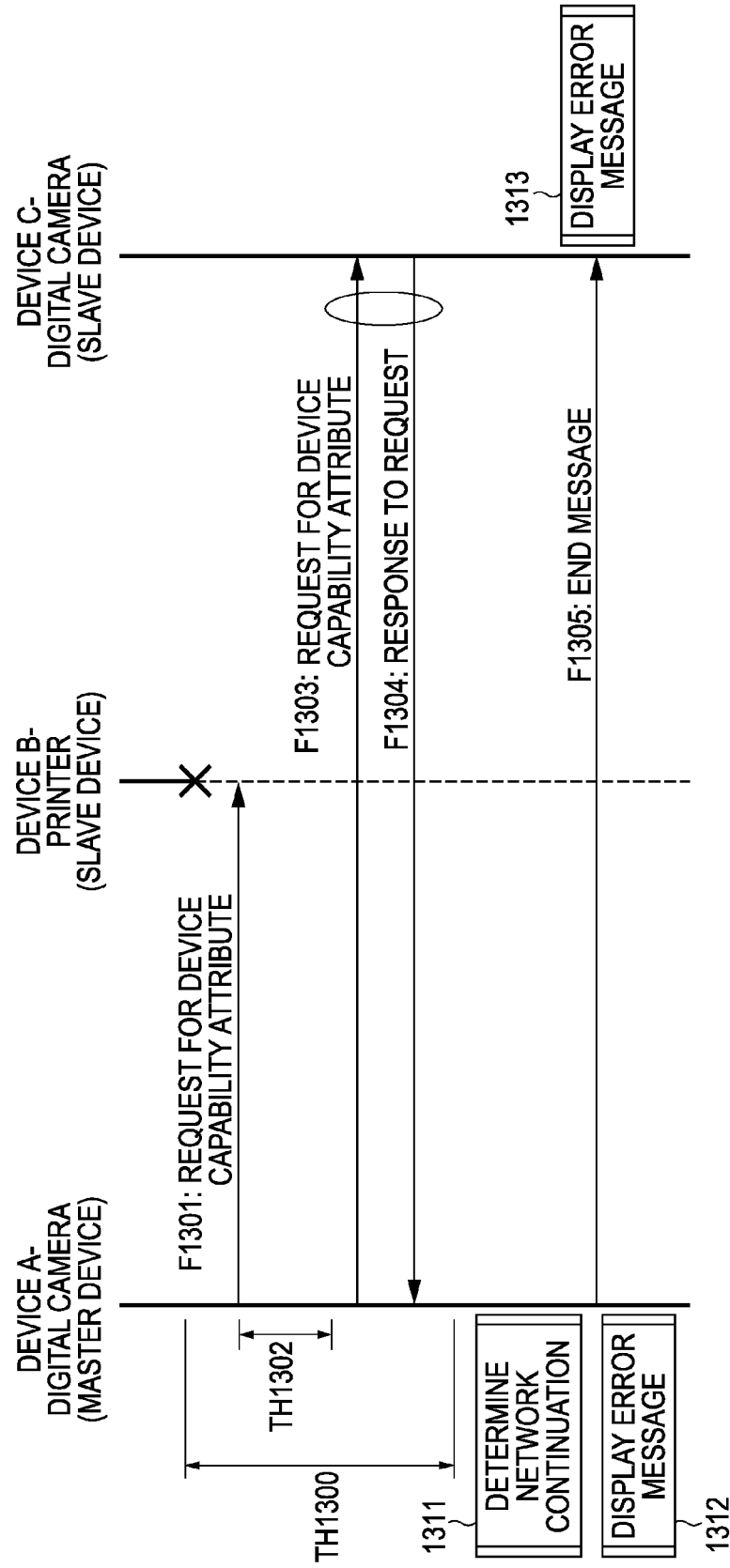
FIG. 13 is a sequence diagram showing an exemplary procedure according to which, after the device A is determined to be a master device in master device determination step, the device A performs network continuation determination processing when in the process an essential device has left the network.

FIG. 13 is a sequence diagram showing an exemplary procedure according to which, after the device A is determined to be a master device in master device determination step 602, the device A attempts to collect device capability attribute information from the device B and device C, which are slave devices, to perform network continuation determination processing when in the process an essential device has left the network. Here, the essential device is the device B (printer 201), which has left the network due to battery exhaustion, deterioration in wireless environment, or the like.

First, after starting the processing, the device A activates a timer for use in collecting device capability attribute information and attempts to collect device capability attribute information from each slave device during a time period TH1300. The device A sends a device capability attribute request message (F1301) to the device B but cannot receive a response therefrom, as the device B has already left the network. When sending the device capability attribute request message (F1301), the device A sets a response waiting timer (for a time period TH1302). If device capability attribute information cannot be received as a response before a timeout occurs, the device A determines that an attempt to obtain device capability attribute information from the device B has failed. Subsequently, the device A sends a device capability attribute request message (F1303) to the device C and receives device capability attribute information (F1304) as a response.

After the timer for use in collecting device capability attribute information comes to an end, the device A uses network continuation condition information (see FIG. 7) stored in the RAM 304 and the collected slave device capability attribute information to perform network continuation determination processing (1311). Since the device A has failed to obtain the device capability attribute information about the device B (printer 201), which is an essential device, in the example shown in FIG. 13, the device A determines that it is impossible to continue the processing. The device A sends an end message (F1305) to the device C, displays an error message in the display unit thereof (1312), and terminates the communication parameter setting unsuccessfully.

Upon receipt of the end message (F1305) from the device A, the device C displays an error message in the display unit thereof (1313) and terminates the communication parameter setting unsuccessfully.

Figure 14:
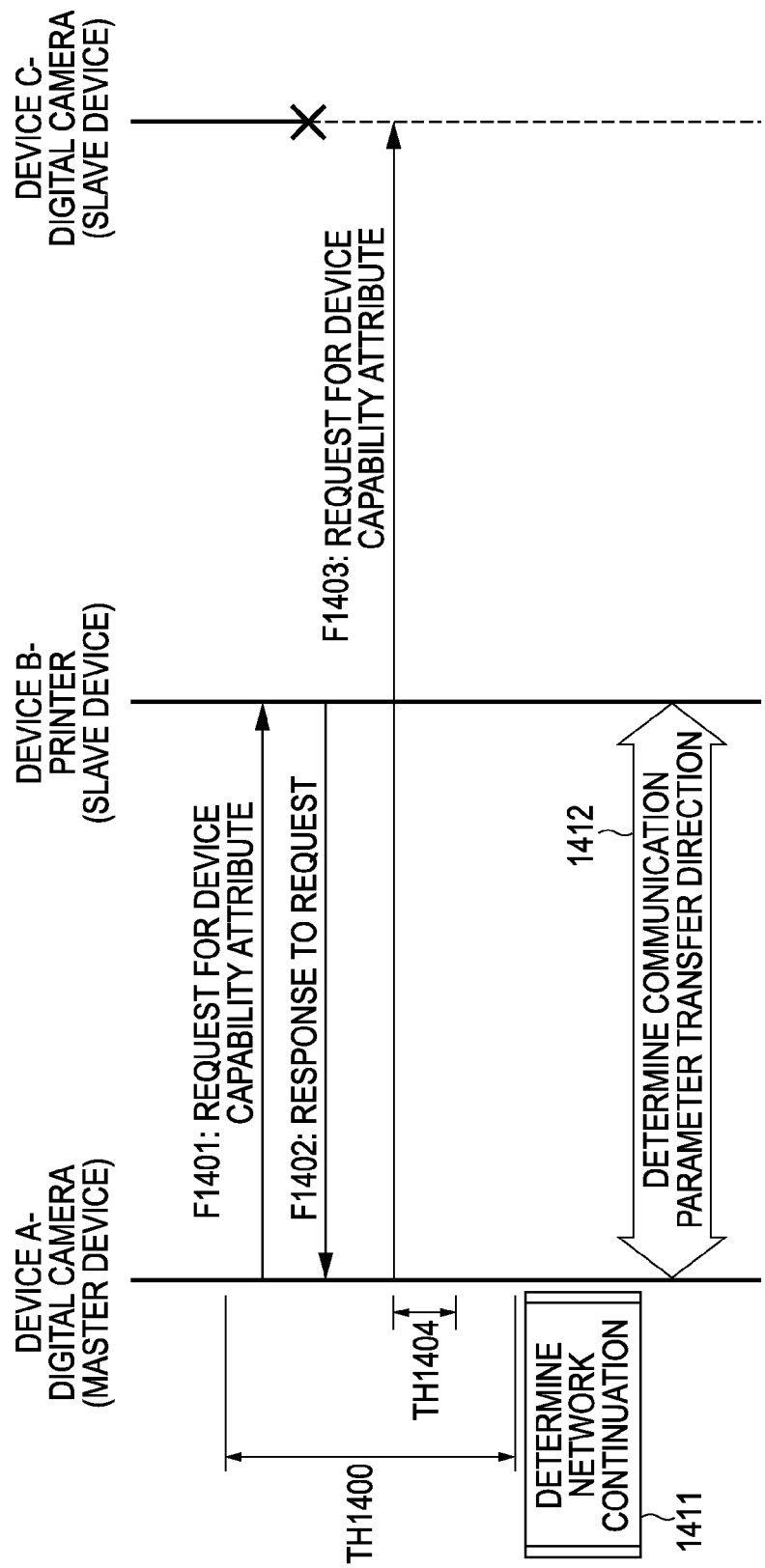
FIG. 14 is a sequence diagram showing an exemplary procedure according to which, after the device A is determined to be a master device in master device determination step, the device A performs network continuation determination processing when in the process the device C has left the network.

FIG. 14 is a sequence diagram showing an exemplary procedure according to which, after the device A is determined to be a master device in master device determination step 602, the device A attempts to collect device capability attribute information from the device B and device C, which are slave devices, to perform network continuation determination processing when in the process the device C has left the network. The device C has left the network due to battery exhaustion, deterioration in wireless environment, or the like.

First, after starting the processing, the device A activates a timer for use in collecting device capability attribute information and attempts to collect device capability attribute information from each slave device during a time period TH1400. The device A sends a device capability attribute request message (F1401) to the device B and receives device capability attribute information (F1402) as a response. Next, the device A sends a device capability attribute request message (F1403) to the device C but cannot receive a response therefrom, as the device C has already left the network. When sending the device capability attribute request message (F1403), the device A sets a response waiting timer (for a time period TH1404). If device capability attribute information cannot be received as a response before a timeout occurs, the device A determines that an attempt to obtain device capability attribute information from the device C has failed.

After the timer for use in collecting device capability attribute information comes to an end, the device A uses network continuation condition information (see FIG. 7) stored in the RAM 304 and the collected slave device capability attribute information to perform network continuation determination processing (1411). Since the device capability attribute information about the device B (printer 201), which is an essential device, has been obtained in the example shown in FIG. 14, the device A determines that it is possible to continue the processing and performs communication parameter transfer direction determination processing (1412) between the device A and device B.

In the examples shown in FIG. 13 and FIG. 14, a device capability attribute request message is sent to a slave device that has already left the network. However, during the setting of communication parameters, the master device continuously monitors whether each slave device is present on the same network and may detect, before sending a device capability attribute request message, that the target slave device has left the network. In this case, the master device does not send a device capability attribute request message to the slave device that has already left the network.

According to the first exemplary embodiment, even if a device has left an ad hoc network where a plurality of devices joining the network are setting communication parameters therefor, a proper determination as to whether to continue the setting can prevent an unnecessary exchange of parameters and improve user friendliness.

Second Exemplary Embodiment

The second exemplary embodiment of the present invention will now be described in detail with reference to the drawings. While the first exemplary embodiment describes processing performed when a slave device has left the network in device capability collection step 603, the second exemplary embodiment describes processing performed when a master device has left the network during the setting of communication parameters.

In the second exemplary embodiment, when a slave device detects that a master device has left the network, each remaining slave device returns to master device determination step 602 to automatically select a new master device from the remaining devices. Then, the new master device obtains device capability attribute information about each slave device and performs network continuation determination processing to determine whether to continue setting communication parameters in the newly created network.

Exemplary network continuation determination processing in the second exemplary embodiment will now be described in detail with reference to sequence diagrams of FIG. 15 and FIG. 16.

Figure 15:
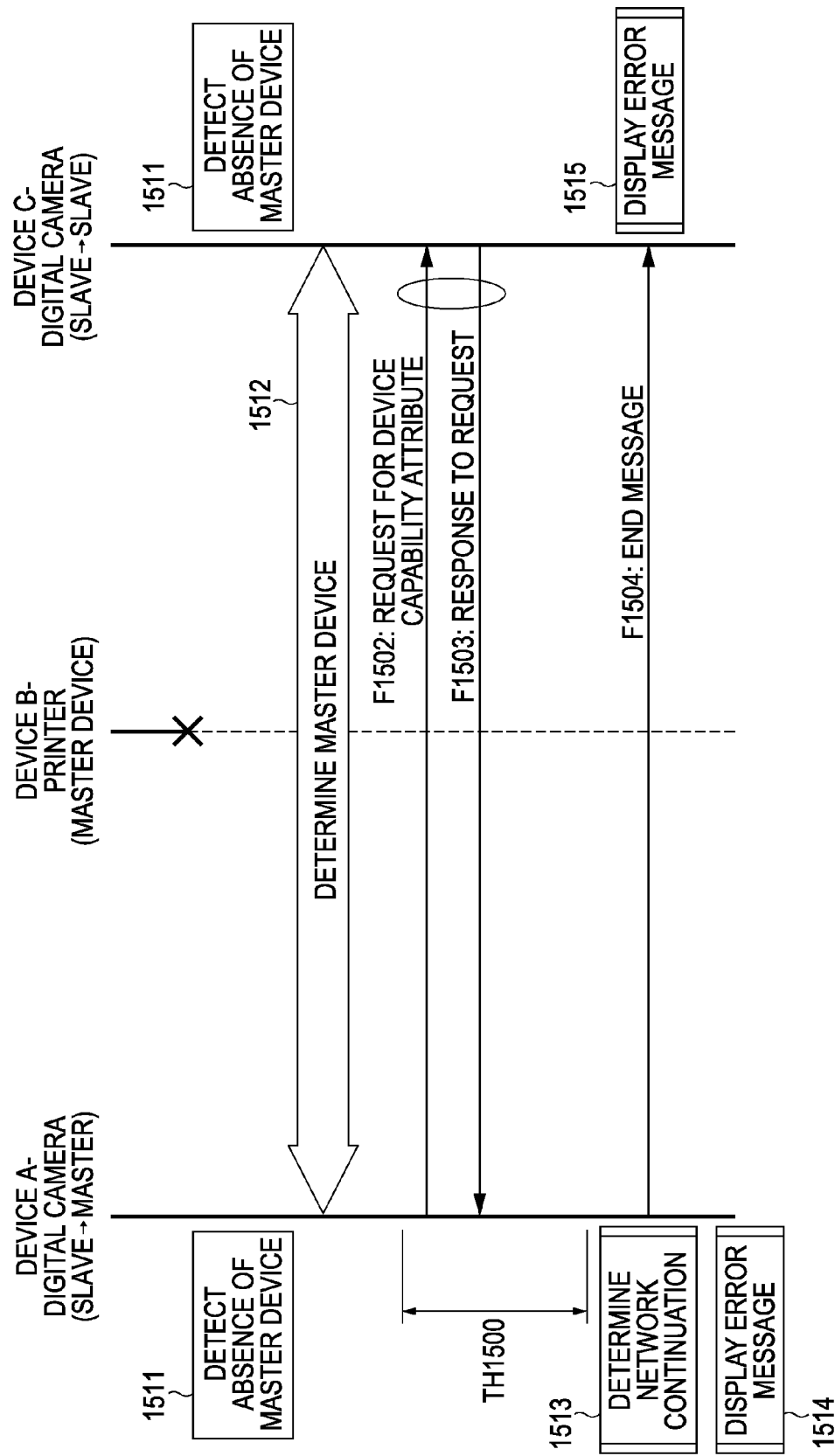
FIG. 15 is a sequence diagram showing an exemplary processing procedure to be followed when the device B that has been a master device has left the network in the process of setting communication parameters.

FIG. 15 is a sequence diagram showing an exemplary processing procedure to be followed when the device B that has been a master device has left the network in the process of setting communication parameters.

First, each slave device continuously monitors the presence of a master device (1511) and detects through the monitoring process that the master device has left the network if it has left the network during the setting of communication parameters. After the detection, each slave device terminates the processing that has been performed and automatically executes master device determination step (1512) again.

In the example shown in FIG. 15, the device A is selected as a new master device in master device determination step (1512). The device A stores network continuation condition information (see FIG. 7) in the RAM 304 serving as a storage unit.

Next, the newly selected device A executes device capability collection step, activates a timer for use in collecting device capability attribute information after starting the processing, and collects device capability attribute information from the slave device C during a time period TH1500. Here, the device A sends a device capability attribute request message (F1502) to the device C and receives device capability attribute information (F1503) as a response.

After the timer for use in collecting device capability attribute information comes to an end, the device A uses network continuation condition information (see FIG. 7) stored in the RAM 304 and the collected capability attribute information about the device C to perform network continuation determination processing (1513). Since the device A has failed to obtain the device capability attribute information about the device B (printer 201), which is an essential device, in the example shown in FIG. 15, the device A determines that it is impossible to continue the processing. The device A sends an end message (F1504) to the device C, displays an error message in the display unit thereof (1514), and terminates the communication parameter setting unsuccessfully.

Upon receipt of the end message (F1504) from the device A, the device C displays an error message in the display unit thereof (1515) and terminates the communication parameter setting unsuccessfully.

Figure 16:
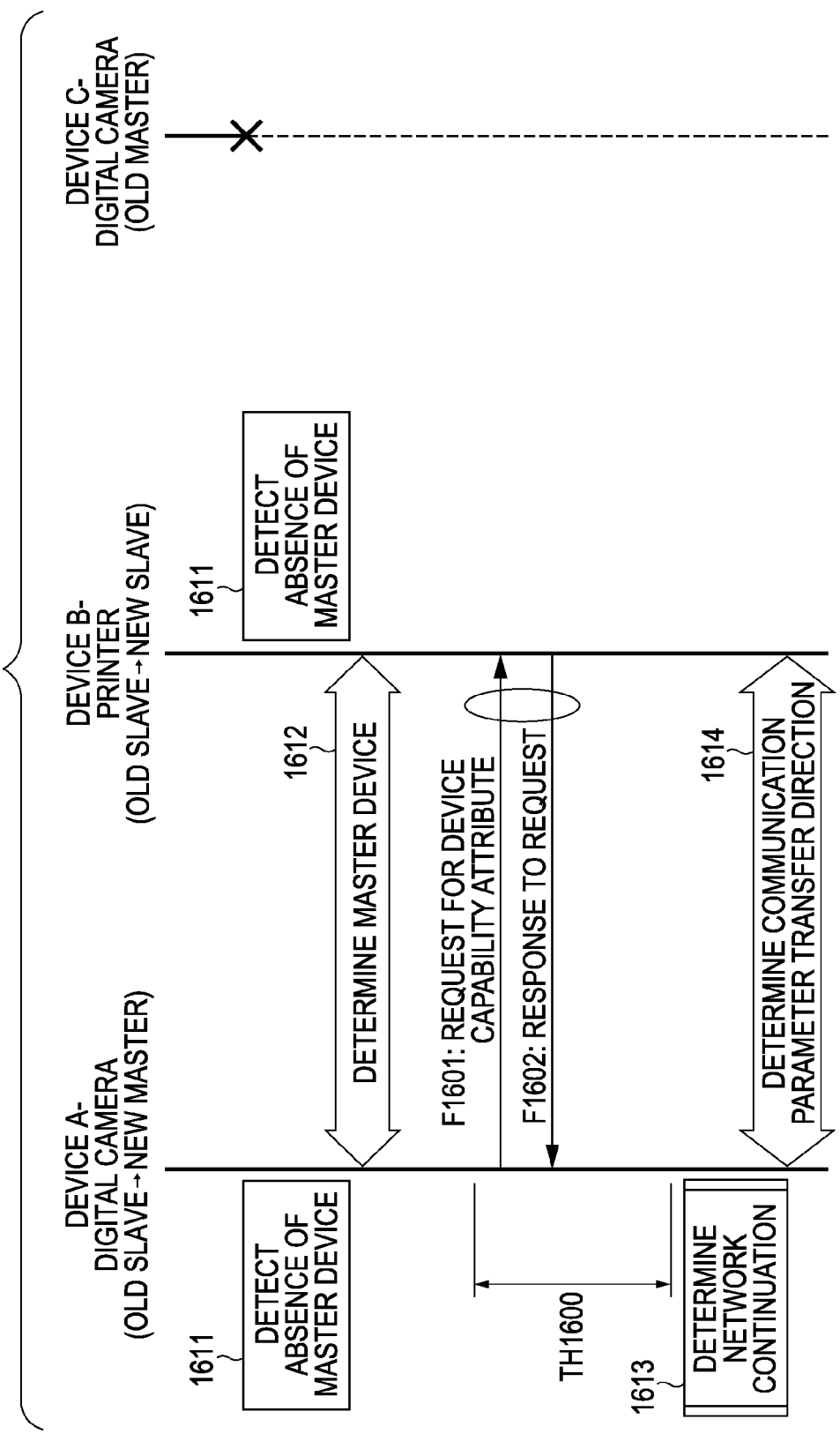
FIG. 16 is a sequence diagram showing an exemplary processing procedure to be followed when the device C that has been a master device has left the network in the process of setting communication parameters.

FIG. 16 is a sequence diagram showing an exemplary processing procedure to be followed when the device C that has been a master device has left the network in the process of setting communication parameters.

First, each slave device continuously monitors the presence of a master device (1611) and detects through the monitoring process that the master device has left the network if it has left the network during the setting of communication parameters. After the detection, each slave device terminates the processing that has been performed and automatically executes master device determination step (1612) again.

In the example shown in FIG. 16, the device A is selected as a new master device in master device determination step (1612). The device A stores network continuation condition information (see FIG. 7) in the RAM 304 serving as a storage unit.

Next, the newly selected device A executes device capability collection step, activates a timer for use in collecting device capability attribute information after starting the processing, and collects device capability attribute information from the slave device B during a time period TH1600. Here, the device A sends a device capability attribute request message (F1601) to the device B and receives device capability attribute information (F1602) as a response.

After the timer for use in collecting device capability attribute information comes to an end, the device A uses network continuation condition information (see FIG. 7) stored in the RAM 304 and the collected slave device capability attribute information to perform network continuation determination processing (1613). Since the device capability attribute information about the device B (printer 201), which is an essential device, has been obtained in the example shown in FIG. 16, the device A determines that it is possible to continue the processing and performs communication parameter transfer direction determination processing (1614) between the device A and device B.

According to the second exemplary embodiment, even if the master device has left the network in the process of setting communication parameters, it is possible to automatically continue the setting of communication parameters between the remaining devices. If the master device that has left the network is an essential device required for processing to be performed in a network to be created according to set parameters, it is possible to immediately terminate the processing and send notifications to the users.

Third Exemplary Embodiment

The third exemplary embodiment of the present invention will now be described in detail with reference to the drawings. In the first exemplary embodiment, network continuation determination processing is performed upon completion of device capability collection step 603. In the third exemplary embodiment, a slave device leaves the network during the setting of communication parameters after device capability collection step 603, and a master device detects that the slave device has left the network. Then, from stored device capability attribute information, the master device deletes information about the slave device that has left the network and performs network continuation determination processing.

Figure 17:
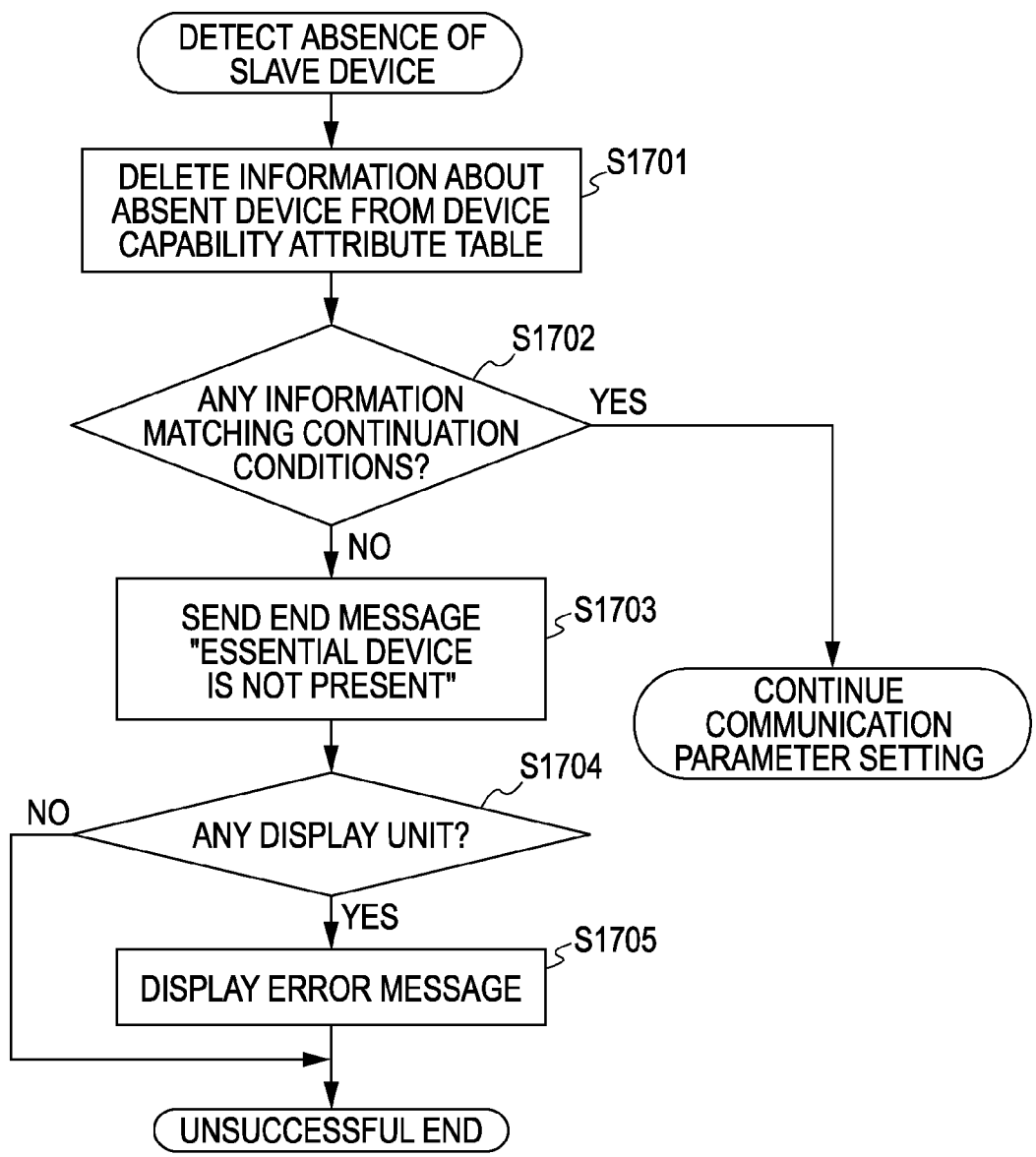
FIG. 17 is a flowchart showing exemplary network continuation determination processing performed by the master device according to a third exemplary embodiment.

Next, network continuation determination processing performed after device capability collection step 603 will be described with reference to FIG. 17 which is a flowchart showing network continuation determination processing performed by the master device according to the third exemplary embodiment. After device capability collection step 603, when the master device detects that a slave device has left the network during the setting of communication parameters, the process proceeds to step S1701. In step S1701, the master device deletes, from a stored device capability attribute information table for slave devices, an item relating to the slave device that has left the network. Next, in step S1702, the master device examines the device capability attribute information table for slave devices to see if there is an item that matches the network continuation condition information. If there is a match, the master device continues the setting of communication parameters.

In step S1702, if there is no item that matches the network continuation condition information, the master device determines that there is no essential device required for the processing and that it is impossible to continue the processing. Then, the process proceeds to step S1703, where the master device broadcasts an end message to each slave device. The end message can contain the cause of termination of the setting of communication parameters. In the third exemplary embodiment, a message "Essential device is not present" is sent as a cause of the termination.

Next, in step S1704, the master device determines whether the device itself has a display unit. If the master device has a display unit, the process proceeds to step S1705. If the master device does not have a display unit, the communication parameter setting ends unsuccessfully.

In step S1705, the master device displays an error message in the display unit thereof to immediately inform the user of the failure of the processing and the cause of the failure. Then, the master device terminates the communication parameter setting unsuccessfully.

Thus, the network continuation determination processing of the third exemplary embodiment is performed according to the procedure described above.

According to the third exemplary embodiment, if a slave device has left the network after device capability attribute information has been obtained, the master device can immediately determine using the obtained device capability attribute information whether to continue the processing.

As described above, according to the present invention, a proper determination as to whether to continue predetermined processing can prevent an unnecessary exchange of communication parameters if a communication device has left the network, and thus can improve user friendliness.

Other Exemplary Embodiments

Although the present invention is applied to a wireless LAN in the first to third exemplary embodiments described above, the present invention is applicable to other wireless communication methods, such as Bluetooth (registered trademark), wireless USB, wireless 1394, ultrawideband (UWB), worldwide interoperability for microwave access (WiMAX) or any other similar wireless protocols.

Although the present invention is applied to printing via a shared printer in the first to third exemplary embodiments described above, the scope of the present invention is not limited to this. For example, the present invention is applicable to reading via a shared scanner. In this case, personal computers and a scanner or multi function peripheral (MFP), instead of digital cameras and a printer, form an ad hoc network. Then, "Scanner" or "MFP", instead of "Printer", is stored as network continuation condition information shown in FIG. 7.

The present invention is applicable to a system composed of a plurality of devices (e.g., a host computer, an interface device, a reader, and a printer), and is also applicable to a system composed of a single device (e.g., a copier or a facsimile).

The present invention may be implemented when a recording medium on which software program code for performing the functions of the above-described embodiments is recorded is supplied to a system or apparatus, and a computer (central processing unit (CPU) or micro-processing unit (MPU)) in the system or apparatus reads and executes the program code stored in the recording medium.

In this case, the program code itself implements the functions of the above-described embodiments and thus, the recording medium on which the program code is recorded constitutes the present invention.

Examples of a recording medium to be used for supplying the program code include a floppy disk, a hard disk, an optical disk, a magneto-optical (MO) disk, a compact-disk read-only memory (CD-ROM), a CD-recordable (CD-R), a magnetic tape, a nonvolatile memory card, and a ROM.

In addition to the cases where the functions of the above-described embodiments are performed when a computer reads and executes the program code, there are other cases where the functions of the above-described embodiments are performed. For example, on the basis of instructions of the program code, an operating system (OS) running on the computer carries out all or part of the actual processing. This also allows the functions of the above-described embodiments to be performed.

The functions of the above-described embodiments are also performed when the program code read out of a recording medium is written in a function expansion board in a computer or in a memory of a function expansion unit connected to a computer and then, on the basis of instructions of the program code, the function expansion board or a CPU in the function expansion unit carries out all or part of the actual processing.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

What is claimed:

1. A communication apparatus comprising:
a memory configured to store a program;
a processor;
the program stored in the memory causes the communication apparatus to:
  acquire information of another communication apparatus;
  decide which of the communication apparatus and said another communication apparatus provides a communication parameter for communicating in a predetermined wireless network;
  communicate the communication parameter with said another communication apparatus according to the decision in a case where which of the communication apparatus and said another communication apparatus provides the communication parameter is decided according to the acquired information of said another communication apparatus and information of the communication apparatus; and
  in a case where which of the communication apparatus and said another communication apparatus provides the communication parameter is not decided according to the acquired information of said another communication apparatus and the information of the communication apparatus:
    1) terminate communication with said another communication apparatus without communicating the communication parameter with said another communication apparatus,
    2) notify said another communication apparatus of failure of communication processing of the communication parameter, and
    3) display an error.

2. The communication apparatus according to claim 1, wherein the information of said another communication apparatus includes type information on said another communication apparatus.

3. The communication apparatus according to claim 1, wherein the communication apparatus notifies a user of a result of the decision.

4. The communication apparatus according to claim 1, wherein the communication parameter is used for wireless communication based on IEEE802.11 series.

5. The communication apparatus according to claim 1, wherein the communication parameter includes an SSID, an encryption method, an encryption key, an authentication method and an authentication key.

6. The communication apparatus according to claim 1, wherein the communication apparatus is a digital camera.

7. The communication apparatus according to claim 1, wherein the communication apparatus determines to decide which of the communication apparatus and said another communication apparatus transfers a communication parameter based on the acquired information of said another communication apparatus and information of the communication apparatus when the information of said another communication apparatus is acquired from said another communication apparatus.

8. The communication apparatus according to claim 1, wherein the error is displayed by using LED.

9. A control method for controlling a communication apparatus, the control method comprising:
acquiring information of another communication apparatus;
deciding which of the communication apparatus and said another communication apparatus provides a communication parameter for communicating in a predetermined wireless network;
communicating the communication parameter with said another communication apparatus according to the decision in a case where which of the communication apparatus and said another communication apparatus provides the communication parameter is decided according to the acquired information of said another communication apparatus and information of the communication apparatus; and
in a case where which of the communication apparatus and said another communication apparatus provides the communication parameter is not decided according to the acquired information of said another communication apparatus and the information of the communication apparatus:
1) terminating communication with said another communication apparatus without communicating the communication parameter with said another communication apparatus,
2) notifying said another communication apparatus of failure of communication processing of the communication parameter, and
3) displaying an error.

10. A non-transitory computer readable storage medium storing a program capable of causing a computer to execute a control method for controlling a communication apparatus, the control method comprising:
acquiring information of another communication apparatus;
deciding which of the communication apparatus and said another communication apparatus provides a communication parameter for communicating in a predetermined wireless network;
communicating the communication parameter with said another communication apparatus according to the decision in a case where which of the communication apparatus and said another communication apparatus provides the communication parameter is decided according to the acquired information of said another communication apparatus and information of the communication apparatus; and
in a case where which of the communication apparatus and said another communication apparatus provides the communication parameter is not decided according to the acquired information of said another communication apparatus and the information of the communication apparatus:
1) terminating communication with said another communication apparatus without communicating the communication parameter with said another communication apparatus,
2) notifying said another communication apparatus of failure of communication processing of the communication parameter, and
3) displaying an error.

* * * * *